E. E. ADIX.
HARROW.
APPLICATION FILED DEC. 28, 1911.
1,034,753.
Patented Aug. 6, 1912.
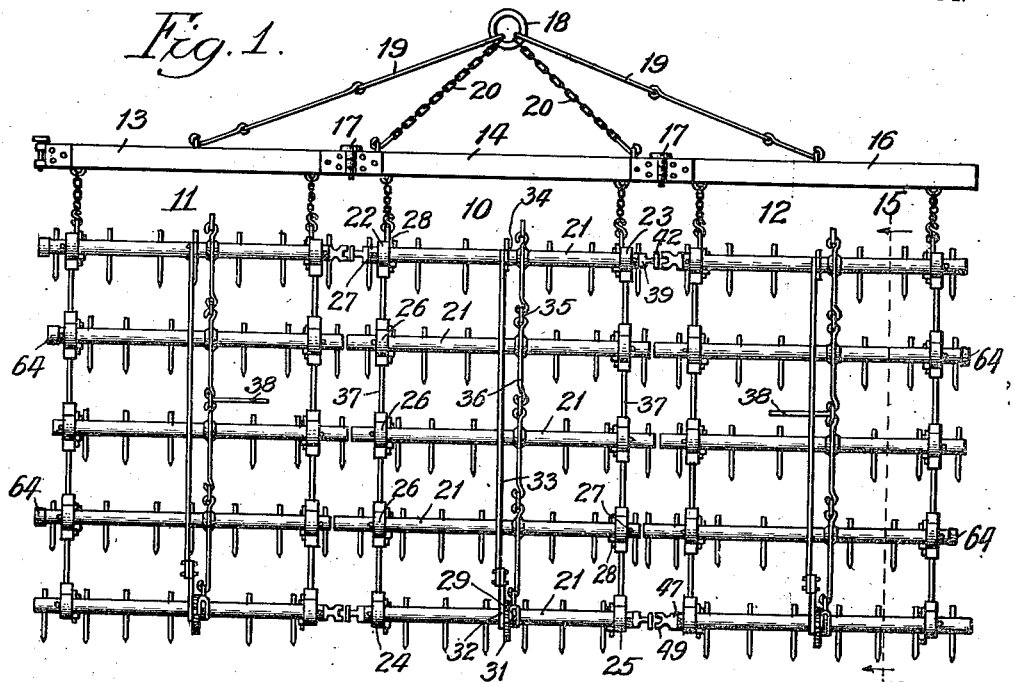
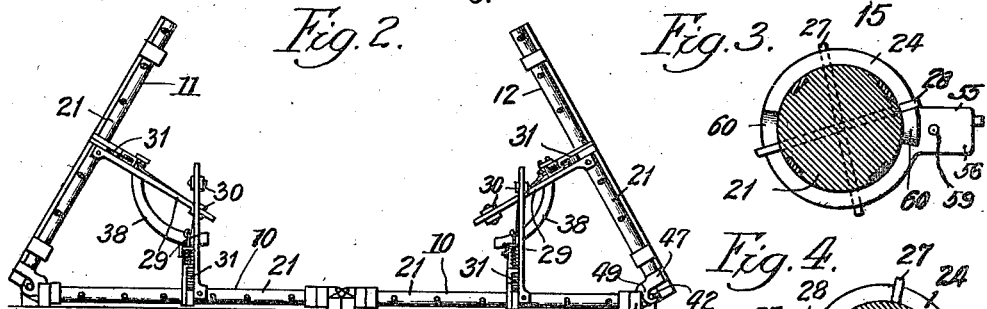
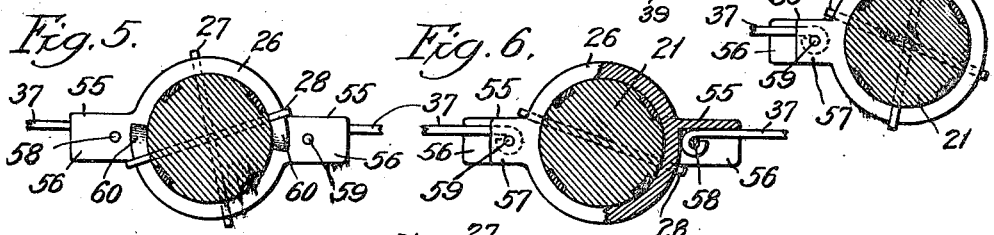
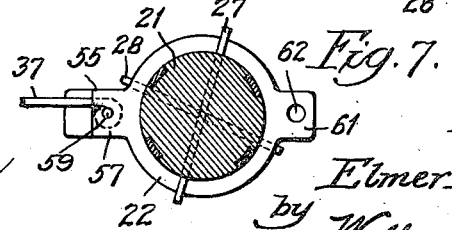
Witnesses:
John Enders
M. E. Martin
Inventor:
Elmer Edward Adix,
by Wallace R. Lane
Atty.

E. E. ADIX.
HARROW.
APPLICATION FILED DEC. 28, 1911.
1,034,753.
Patented Aug. 6, 1912.
2 SHEETS—SHEET 2.
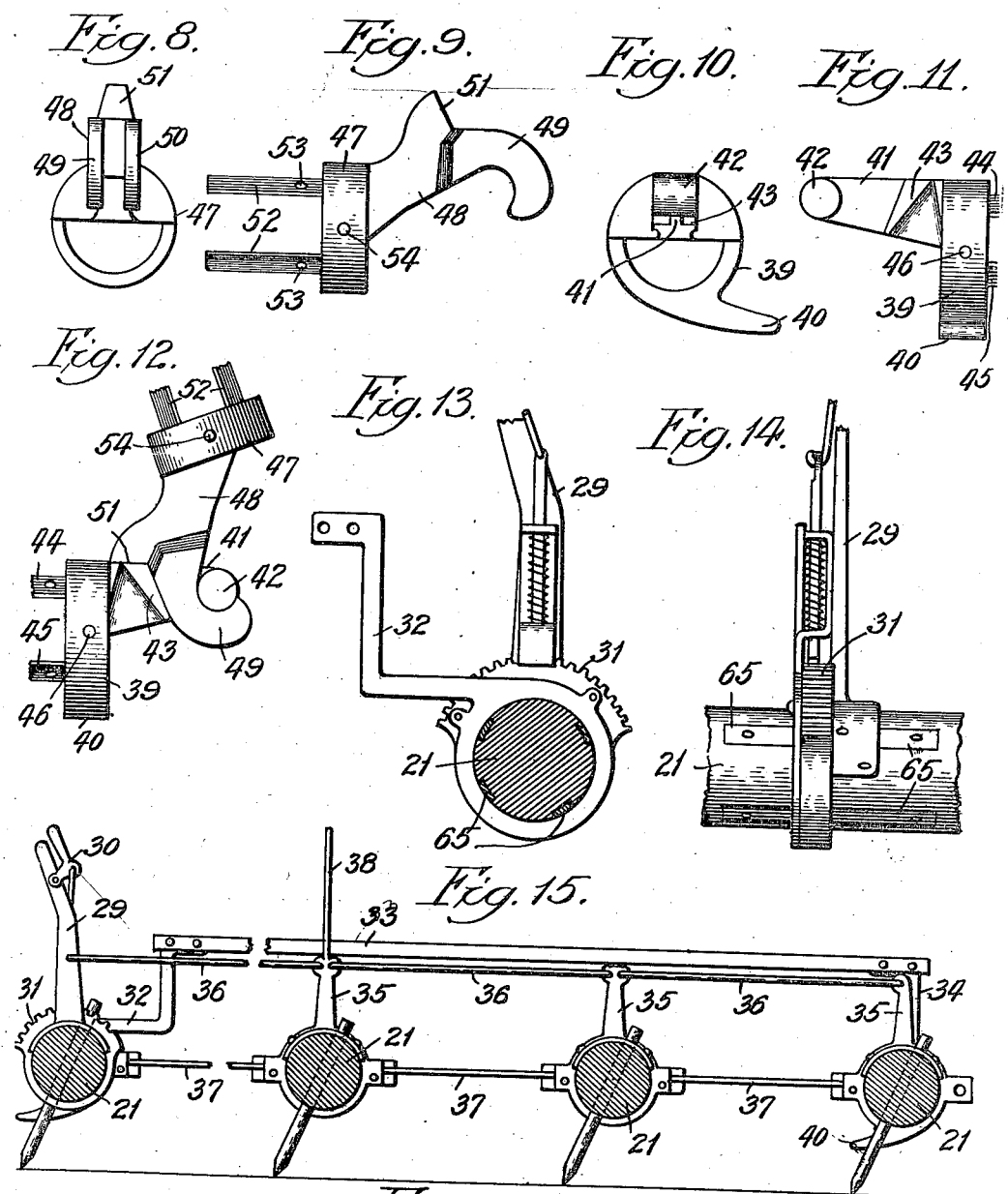
Witnesses:
John Enders
M. E. Martin
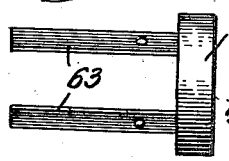
Inventor:
Elmer Edward Adix,
by Wallace R. Lane
Atty.

UNITED STATES PATENT OFFICE.

ELMER EDWARD ADIX, OF BOONE, IOWA.

HARROW.

1,034,753.

Specification of Letters Patent.

Patented Aug. 6, 1912.

Original application filed May 23, 1910, Serial No. 562,829. Divided and this application filed December 28, 1911. Serial No. 668,906.

*To all whom it may concern:*

Be it known that I, ELMER EDWARD ADIX, a citizen of the United States, residing at Boone, in the county of Boone and State of Iowa, have invented new and useful Improvements in Harrows, (division of my application, Serial No. 562,829, filed May 23, 1910,) of which the following is a specification.

The object of my invention is to provide a harrow of simple, durable and inexpensive construction, capable of being folded together and designed to be flexible when in an operative position and to be rigid when in a folded position.

A further object of my invention is to provide a harrow comprising a plurality of sections which are similar in construction and which are designed to be connected and folded when not in operation, and to be disconnected when they are in operation.

A further object is to provide special bearings and fittings for the toothed members of the harrow, together with levers for turning those members, so that the sections of the harrow may be made rigid when the teeth are adjusted into position out of engagement with the ground.

My invention consists in the construction, arrangement and combination of the various parts of the device, whereby the objects contemplated are attained as hereinafter more fully set forth, pointed out in my claims and illustrated in the accompanying drawings, in which—

Figure 1 is a plan view of a harrow comprising three sections; Fig. 2 is an end elevation of a similar four-section harrow in folded position; Fig. 3 is a section through a toothed bar, showing one of the bearings for the bar; Fig. 4 shows the opposite side of said bearing; Fig. 5 is a side elevation of another form of bearing; Fig. 6 illustrates the opposite side of the same; Fig. 7 is a side elevation of a third form of bearing for the toothed bars; Fig. 8 is an end elevation of one of the hooked connecting members; Fig. 9 is a side elevation of the same; Fig. 10 is an end elevation of one of the connecting members adapted to engage with the hook of Fig. 9; Fig. 11 is a side elevation of the same; Fig. 12 illustrates the members of Figs. 9 and 11 in operative engagement; Fig. 13 is a side elevation of certain details of a lever for operating the toothed bars; Fig. 14 is an end elevation of the same; Fig. 15 is a sectional view on the line 15—15 of Fig. 1 looking in the direction of the arrow; Fig. 16 is a detail of bearing plates with their rings attached.

Referring to Fig. 1, the reference numerals 10, 11 and 12 indicate the different harrow sections. In this figure only three sections are shown, while in Fig. 2 four sections are shown, it being apparent that with this type of harrow additional sections may be added without modifying the basic principles of the invention.

The evener bar, to which the sections of Fig. 1 are connected, is made up of a plurality of sections 13, 14 and 16, detachably connected by hinges and detachable pins 17. The motive power may be applied to the evener bar through the ring 18 and the links 19 and chains 20.

Each harrow section comprises five horizontal toothed bars or members 21. The foremost of these members is mounted in bearings 22 and 23 and the rearmost member in bearings 24 and 25. The three intermediate bars are carried in bearings 26, as is best shown in Fig. 1. Retaining pins 27 and 28 pass through the toothed members 21 on opposite sides of the bearings 22 to 26 inclusive.

The operating levers 29 are fixed to the rear toothed members of each section and are provided with hand-operated pawls 30 which engage the pivotally mounted sectors 31 carried by the toothed bars. Secured to each sector 31, in an upright position, is a bar 32 which extends forwardly and upwardly and which, at its upper end, is rigidly connected to a bar 33 which extends forwardly to the front of the implement and is there connected to an upwardly extending bar 34 pivotally mounted on the forward toothed member of the section. This construction spaces the forward and rear toothed bars the proper distance apart. Upwardly extending levers or arms 35 are fixed to all but the rear toothed members and are connected by rods 36 which are pivotally connected to the operating levers 29. Bars or rods 37 are pivotally connected to the bearings 22, 23, 24, 25 and 26, holding them apart in their proper relative positions and, at the same time, allowing the bearings to move vertically, except when in one position of their adjustment, said position being hereinafter more fully described.
As shown in Figs. 2 and 15, the two outermost sections of the harrow may be provided with upwardly extending curved projections 38, each designed to engage the bar 33 of an inner section when the outer sections are folded up, as shown in Fig. 2, thereby obviating the strain on the hinge connections between the outer and inner sections.

The connections for securing the harrow sections together when they are not in operation comprise two members in temporary locking engagement, as shown in Fig. 12. Connecting members for the intermediate section 10 or sections may be of the form shown in Figs. 10 and 11, comprising bearing portions 39 which fit over the ends of the forward and rear tooth-supporting members 21 and runners 40 which extend downwardly and rearwardly from the bearing portions and are designed to receive the weight of the intermediate harrow section 10 when the teeth of the harrow are tilted out of engagement with the ground. A projection 41 at the side of the bearing portion 39 carries a cross-bearing 42 and shoulders 43 for insuring a locking engagement, as shown in Fig. 12. Bearing bars 44 and 45 extend from the other side of the bearing portion 39 and are designed to seat in grooves in the surface of the toothed bars 21 to form wearing surfaces for the bearings. Members, such as are illustrated in Figs. 10 and 11, may be fixed to the forward and rear toothed bars 21 of the middle section 10 of the harrow, pins 46 extending through correspondingly numbered openings in the bearing portion 39 and similar pins extending through the bearing arms 44 and 45. Hooked connection members are applied to the inner ends of the front and rear toothed bars 21 in the outermost sections of the harrow and are of the shape illustrated by Figs. 8 and 9. They comprise bearing portions 47 with extensions 48 provided with hooks 49 and 50 spaced apart from each other. These are also provided with lugs 51 extending upwardly therefrom. Outwardly extending plates or bars 52 are fixed to the portion 47 and are arranged for attachment to the toothed bars 21 by pins extending through openings 53 and 54. The plates or bars 52, like the corresponding parts of Fig. 11, are adapted to seat in the toothed members to form wearing surfaces for the bearings of the harrow.
Fig. 12 shows how the hooks of Fig. 9 engage with the bearings of Fig. 11 to prevent upward movement of the hooked members, the shoulders 43 engaging the hooks 49 and the lugs 51 engaging the outwardly extending portions 41 to prevent further inward movement of the hooked members and thus to carry the end sections in a folded position, as shown in Fig. 2 of the drawings.

The bearings 26 (Fig. 6) are provided with flanges 55 extending outwardly from each side, each being provided with downwardly extending flanges 56 and 57. Pins 58 and 59 are mounted in said flanges to form bearings for the rods or bars 37. Lugs 60 extending outwardly from the faces of the bearings 26 are designed to engage the pins 28, said pins being in engagement with said lugs when the toothed members 21 are returned to position with the teeth out of engagement with the ground surface.

With the arrangement of parts above described, the toothed members will be prevented from longitudinal movement by the flanges 56 and 57 and will be free to move vertically except when the pins 28 engage the lugs 60, at which times the bearings 26 are stationary and the flanges 55 prevent vertical movement and thus form a substantially rigid harrow section.

The bearings 22, 23, 24 and 25 are similar to the bearings 26, except that only one set of flanges 55, 56 and 57 extends outwardly therefrom. The flanges 61 (Fig. 7) extending outwardly from the bearings 22 and 23 are provided with openings 62, through which the chains of the evener may be attached. To obtain suitable bearing surfaces for the bearings of the harrow, I have provided, in addition to the bearing plates of Figs. 9 and 11, the bars 63 shown in Fig. 16. These extend inwardly from the rings 64, these rings being designed to fit in the ends of the toothed bars in such a way that the portions 63 may form bearing surfaces for these bars.

In the positions where the structures of Figs. 8 to 11 and Fig. 16 cannot be used, I have provided bars 65 designed to be seated in the toothed bars and to be fixed thereto so that they will serve as bearing surfaces for the bearings and for the rotatably mounted sector 31, as shown in Figs. 14 and 15.

In the practical operation of my device, assuming that the several sections are in extended position and disconnected from each other, the operating levers 29 are adjusted relative to the sectors 31 to elevate the teeth to substantially vertical positions. The harrow is then drawn over the ground, each tooth-supporting bar being free to move vertically and thus accommodate itself to the unevenness of the ground surface. When it is desired to pass through a gate or other narrow opening, the levers 29 are moved forwardly, thus changing the harrow teeth to a position away from the ground surface, thereby allowing the weight of the intermediate harrow section or sections to rest upon the runners 40, at the same time moving pins 28 into position for engagement with the lugs 60 of the bearings to form a rigid construction of each section. During normal use the front and rear bars are held in rigid relation to one another by the connecting member which bridges the intermediate bars, while the intermediate bars are left somewhat free to float up and down in accordance with the inequalities of the ground. But when the hand lever is rocked forward to take the teeth out of engagement with the ground and to drop the harrow section on its four runners, the pins on the tooth bar engage the stops on the bearings and twist those bearings sufficiently to tighten up all slack in the connections, yielding a connection which is rigid from end to end and which is supported at its four corners by the four runners. The hooked connecting members on the outer harrow sections are then applied to the bearing connection members of the inner section or sections and the outer sections are then lifted upwardly and tilted inwardly to folded position, as shown in Fig. 2. The evener bar can also be folded up at each end. When the outer sections are in folded position, as shown in Fig. 2, the curved projections 38 of the outer sections rest on the bars 33 of the inner sections, thereby relieving the hinged connections of undue strain.

To obtain an operative device, it is only necessary to lower the end sections and disconnect them from the intermediate sections and then move the operating levers 29 rearwardly to bring the harrow teeth again in engagement with the ground surface.

What I claim as new and desire to secure by Letters Patent of the United States, is:

1. In a harrow, the combination of a plurality of harrow sections arranged side by side and comprising each a series of teeth-supporting bars, hinge connections between the end sections and the intermediate sections, said hinge connections comprising each a pair of members having a bearing portion to fit over the teeth supporting bar and a hinged portion for establishing a pivotal engagement between the adjoining sections.

2. In a harrow, the combination of a plurality of harrow sections arranged side by side and comprising each a series of teeth-supporting bars, hinge connections between the end sections and the intermediate sections, said hinge connections comprising each a pair of members having a bearing portion to fit over the teeth supporting bar and a hinged portion for establishing a pivotal engagement between the adjoining sections, and stops on said members for limiting the movement of one member relative to the other when the end sections are folded.

3. In a harrow, the combination of a harrow section comprising a series of tooth bars, bearings for rotatably supporting said bars, pivoted connections for holding the same apart in predetermined relation, means for rotatably adjusting said bars to alter the declination of the teeth and to tighten the connections between adjacent bars, another harrow section arranged at the side of said first named section, and a detachable hinge whereby said sections may be temporarily connected and whereby one section may be folded over the other and carried thereby.

4. In a harrow, the combination of a harrow section, comprising a series of toothed bars, bearings for rotatably supporting said bars, connections between said bearings for holding the same in predetermined relation, these connections normally permitting up and down movement of the bars in conformity with the roughness of the ground, means for tightening said connections to stiffen the harrow section, and a second harrow section connected to said first-named section by hinges and adapted to fold over and ride on the stiffened section.

5. In a harrow, the combination of a harrow section comprising a series of bars provided with teeth, bearings for rotatably supporting said bars, a rigid connection between the front and rear bar holding them a predetermined distance apart, connections between the bearings of intermediate bars holding the bars loosely, and normally permitting the vertical movement thereof to conform to the inequalities of the ground, and means for rotating said bars in their respective bearings to throw the teeth out of engagement with the ground, and to stiffen the section by tightening the connections between adjacent bearings, runners at the front and rear of the stiffened section, and a second section hinged to said first named section and adapted to fold thereover and rest thereon for transportation over the ground on said runners.

6. In a harrow, the combination of a plurality of harrow sections connected together side by side, the end sections being pivotally connected to an intermediate section and adapted to fold thereover, said pivotal connection including two metal members hooked together and having shoulders thereon to limit the movement of the folded section.

7. In a harrow, the combination of a plurality of harrow sections connected together side by side and pivotally connected to one another, said pivotal connection including a metal member set into the end of a harrow bar and having a pair of hooks spaced apart, and a corresponding metal member connected to the opposite harrow section, and having a cross piece engaging with both of said hooks, said metal hinged members carrying shoulders to limit the swing of said pivotally connected sections.

In witness whereof, I hereunto subscribe my name to this specification in the presence of two witnesses.

ELMER EDWARD ADIX.

Witnesses:
 ADA REED,
 J. R. WHITAKER.